July 24, 1951     R. A. FRYKLUND     2,561,851
ECHO RANGING SYSTEM
Filed May 15, 1948
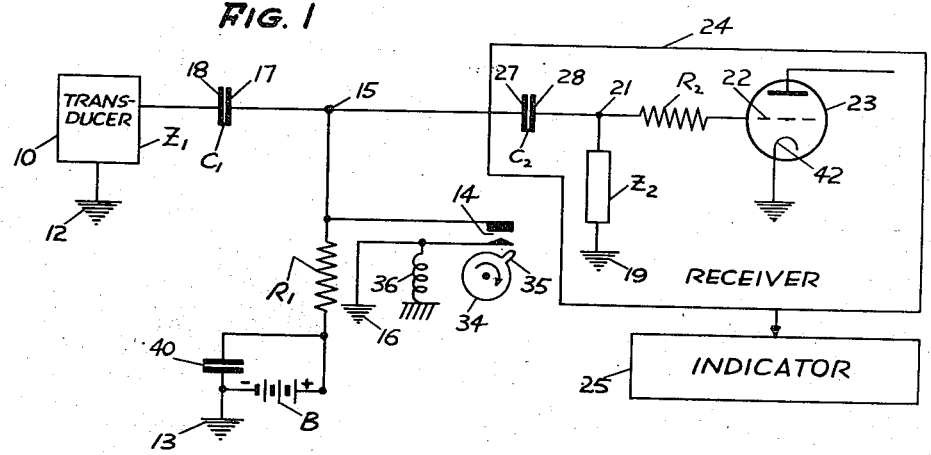
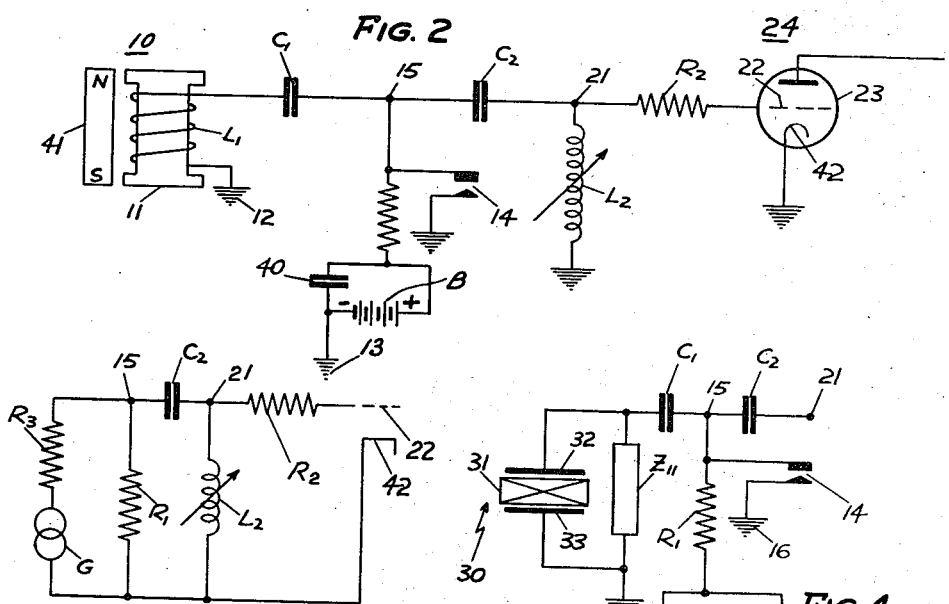
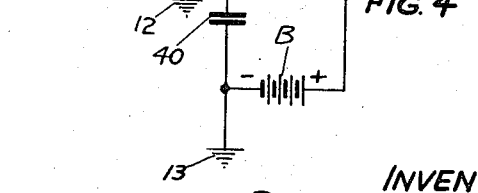
INVENTOR
ROBERT A. FRYKLUND
BY
ATTORNEY Patented July 24, 1951

2,561,851

UNITED STATES PATENT OFFICE 2,561,851

ECHO RANGING SYSTEM

Robert A. Fryklund, Somerville, Mass., assignor to Raytheon Manufacturing Company, a corporation of Delaware Application May 15, 1948, Serial No. 27,210

13 Claims. (Cl. 177—386)

This invention relates in general to electrically operated pulsed underwater echo ranging and sounding systems wherein a single electroacoustic transducer is employed for both the transmitting and the receiving functions, and in particular to a novel transmit-receive circuit for such a system which automatically isolates the receiver-amplifier from the transducer and driver circuit during transmission.

It is an object of the invention to provide an improved pulsed echo sounding system.

It is another object of the invention to provide a transmit-receive circuit for such a system which can be built with a minimum of components, and operated efficiently with high pulse power from a small power source.

It is a further object of the invention to provide such a circuit that will simultaneously produce an extremely short exploratory pulse of high power and adequately block and protect the receiving circuits during transmission and will quickly unlock the receiving circuit after transmission so that objects lying at very close ranges can be detected and their distances measured.

It is a still further object to provide such a system which is simple to construct and maintain, relatively inexpensive to construct, and easy to operate.

The foregoing and other objects and features of the invention will become apparent from the detailed description of certain embodiments thereof that follows, reference being made to the accompanying drawing, wherein:

Fig. 1 illustrates the invention in schematic form;

Fig. 2 illustrates an embodiment thereof;

Fig. 3 is an equivalent circuit diagram of the embodiment shown in Fig. 2; and

Fig. 4 illustrates another embodiment of the invention.

In Fig. 1, a transducer 10 which has an impedance $Z_1$ is connected in a series circuit with a storage capacitor $C_1$ of sufficient size to store a substantial charge, a resistor $R_1$, and a source of unidirectional voltage, which may be a battery B. A by-pass capacitor 40 is connected in shunt with the source B. The series electrical circuit is completed through ground connections 12 and 13 at one end of the transducer 10 and at the negative side of the voltage source B, respectively. A normally open momentary contact switch or key 14 is connected from a point 15 between the resistor $R_1$ and the capacitor $C_1$ to ground at 16. This switch may conveniently be actuated by a rotating cam disc 34 having a projecting actuator 35 thereon, which periodically closes the switch against the action of a retaining spring 36 which tends to hold the switch open.

The receiver comprises a second capacitor $C_2$ which is considerably smaller than the storage capacitor $C_1$ and a second impedance element $Z_2$ series connected between the switch point 15 and ground at 19. A resistor $R_2$ is connected from the junction point 21 between the second capacitor $C_2$ and second impedance element $Z_2$ to the control grid 22 of the input stage tube 23 of the receiver 24, which is otherwise represented in block diagram form. The receiver provides suitable information signals to an indicator 25 in any well known fashion.

In operation, with the switch 14 open, the first capacitor $C_1$ is charged by the battery B, through the resistor $R_1$, the transducer 10 and ground at 12 and 13, so that the nearer side 17 thereof, namely the side that is connected to the switch point 15, is positive with respect to the other or far side 18, and said far side 18 is at ground potential. Similarly, the second capacitor $C_2$ in the receiver 24 is charged from the batttery B, through the resistor $R_1$, the impedance element $Z_2$, and ground at 19 and 13, so that its near side 27 is positive with respect to its far side 28, and its far side 28 is at ground potential. From another point of view, the transducer 10, the two capacitors $C_1$ and $C_2$ and the impedance element $Z_2$ are series connected in that order, and the two capacitors are so charged that their extreme sides 18 and 28, respectively, are at ground potential, while their mean sides 17 and 27, respectively, are at a positive potential with respect to ground.

To transmit a signal, the switch 14 is closed, the battery B and resistor $R_1$ in series are short-cuited thereby, and the mean sides 17 and 27 of the capacitors $C_1$ and $C_2$, respectively, are substantially instantaneously brought to ground potential. Simultaneously and just as suddenly, the extreme sides 18 and 28 are depressed to a negative potential equal to the potential difference then existing across each capacitor $C_1$ or $C_2$. With the switch 14 closed, capacitor $C_1$ begins to discharge through the transducer 10, ground at 12 and 16, and the switch, and capacitor $C_2$ begins to discharge through the impedance element $Z_2$, grounded at 19 and 16, and the switch. The discharge currents may either or both be periodic or aperiodic, depending on the nature and magnitudes of the various electrical components of the two respective discharge circuits. In either case, the initial surge of current from the storage capacitor $C_1$ shocks the transducer 10 into oscillation at its own frequency of mechanical resonance. The switch 14 simultaneously short-circuits the input of the receiver 24, so that the high power that is furnished to the transducer is isolated therefrom. Since the extreme sides 18 and 28 of the two capacitors are simultaneously driven negative with respect to ground when the switch 14 is closed, the discharge from the second capacitor $C_2$ simultaneously cuts off the input tube 23 of the receiver 24. When the receiver circuit of $C_2$ and $Z_2$ is periodic, this occurs during the initial half cycle and subsequent negative half cycles of the discharge of the second capacitor $C_2$, and the grid resistor $R_2$ prevents an unsafe flow of grid current during those times when the grid 22 is positive with relation to the cathode.

As will be pointed out in detail below, when a condenser $C_1$ or $C_2$ is in a periodic circuit, it is preferable that the period shall be the same as the natural mechanical period of the transducer 10. The switch 14 is a momentarily operated switch, however, and is preferably opened after a short almost instantaneous contact, for example within a few cycles of the oscillation of the transducer 10, so that the resistor $R_1$ and source B are soon reintroduced into the discharge paths of the two capacitors $C_1$ and $C_2$. At this time the resistor $R_1$ tends to damp out any oscillatory energy that may be present in the two discharge circuits. The by-pass capacitor 40 passes such oscillatory energy around the D. C. voltage source B. At the same time, the voltage source B begins to recharge the capacitors $C_1$ and $C_2$ through the resistor $R_1$.

When the switch 14 is opened, the short circuit across the input of the receiver is removed, and the receiver is ready to be energized by incoming echo signals arriving at the transducer 10, through the two series circuits $C_1Z_1$ and $C_2Z_2$, which are in effect resistance coupled by the charging resistor $R_1$. Immediately upon the opening of the switch 14, energy from the still ringing transducer 10 is impressed upon the receiver input circuit. The energy that is available at this time is of a lower order of magnitude, however, than during the first few cycles of the transducer oscillations, and serves to furnish a zero mark signal without dangerously overloading the receiver. The input signal for the first tube 23 is developed across the second impedance element $Z_2$. The recharging of the two capacitors $C_1$ and $C_2$ occurs during the receive time, but has no effect upon the receiving function of the system. The received signal is oscillatory, at perhaps 40 kc./sec., and is passed around the voltage source B by the by-pass capacitor 40. The charging current is aperiodic, and the charging circuits are so arranged that the far sides 18 and 28 of the two capacitors remain substantially at ground potential, as far as D. C. is concerned, during the charging cycle, so that the grid bias of the first tube 23 is not affected. The charging resistor $R_1$ is chosen with respect to size so that a suitable charge for actuating the transducer 10 is placed upon the first capacitor $C_1$ prior to each closing of the switch 14, and, at the same time, so that it will protect the battery B from a dangerous short circuit when the switch 14 is closed. The switch 14 is chosen to bear a large momentary surge of current from both capacitors during transmission.

Thus the invention provides a sharp exploratory pulse of sound energy, with simultaneous blocking of the receiver circuit, quick damping of the energizing power source, and substantially instantaneous unblocking of the receiver after the generation of the exploratory pulse.

As has been pointed out above, one or both of the two series circuits $C_1$ and $Z_1$, and $C_2$ and $Z_2$ may be tuned circuits. When both are tuned $Z_1$ and $Z_2$ are both inductive. The two circuits will then be tuned preferably to the same frequency as that to which the transducer 10 is mechanically resonant. Fig. 2 illustrates an embodiment of the invention employing such an arrangement. The transducer 10 is of the magnetostrictive type, having a magnetostrictive core 11 and a cooperating coil $L_1$. A permanent magnet 41 provides polarization of the core 11. An inductor $L_2$ is employed in the receiver input circuit as the impedance element $Z_2$. The first capacitor $C_1$ is chosen to provide maximum pulse energy transfer from the transducer 10 to the surrounding water. This can be done experimentally, and it will be found that for any given transducer some optimum size for the capacitor will exist. When the transducer is inductive, as in Fig. 2, the particular size of the capacitor $C_1$ that is thus determined is effectively that size which affords resonance between the electrical circuit including $C_1$ and $L_1$ in series and the transducer 10. The first capacitor $C_1$ will thus be small or large, depending on the transducer characteristics, but it is always large compared with the second capacitor $C_2$, since it is the one that stores energy. The second capacitor $C_2$ is chosen much smaller than the first, since its main function is to isolate the unidirectional voltage of the power source B from the receiver 24. It functions also, in Fig. 2, in cooperation with the inductor $L_2$ to tune the receiver input circuit to series resonance at the same frequency as the transducer circuit. To this end the receiver input circuit inductor $L_2$ is conveniently made variable.

During the transmission of a signal, the two capacitors $C_1$ and $C_2$ are discharged in oscillatory fashion through the inductive loads $L_1$ and $L_2$, respectively. Quick damping of the discharges by the reintroduction of the charging resistor $R_1$ into the discharge circuits, as in Fig. 1, is retained. The transducer 10 is shock excited by the discharge of capacitor $C_1$, and the oscillation of the discharge aids in maintaining the excitation thereof.

During the reception, the transducer 10 may be considered as a signal generator, connected in a purely resistive circuit to the input of the receiver 24. This situation is illustrated in Fig. 3, where the signal generator G is shown connected in series with a resistor $R_3$ which represents the ohmic resistance of the circuit of $C_1$ and $L_1$. The value of $R_3$ for a typical magnetostrictive transducer and circuit is about ten ohms, while the value of the charging resistor $R_1$ which is effectively shunted thereacross is about 50,000 ohms, so that attenuation of the received signal thereby is minimized. The by-pass capacitor 40 of Fig. 2 has so little ohmic resistance to the received signal as to be negligible in Fig. 3. The received signal that appears across the charging resistor $R_1$ is impressed upon the input of the receiver 24 across $C_2$ and $L_2$ in series, which are tuned to series resonance at the frequency of the received signal. The voltage that appears across the inductor $L_2$ is applied between the grid 22 and the cathode 42 of the first tube 23 of the receiver through the limiting resistor $R_2$. This tuned circuit arrangement provides maximum signal voltage at the grid 22. If an aperiodic amplifier is to be employed, the inductor $L_2$ may be removed and a suitable resistor substituted therefor, whereupon the problem of signal gain may be handled with additional amplifier stages.

In a practical embodiment of the invention according to Fig. 2, the transducer 10 was mechanically resonant at about 40 kilocycles per second. With a coil $L_1$ of sufficient turns to energize the core, the first capacitor $C_1$ was 0.25 mfd. in size for optimum power transfer into water. The Q of the circuits of $L_1$ and $C_1$ was maintained initially low to provide broad band tuning and aid in damping out ringing. The second capacitor $C_2$ was 0.001 mfd. in size, and $L_2$ was adjustable. With this arrangement, and employing thereafter an aperiodic receiver which itself had quick recovery time, depths as low as six inches were successfully measured.

As shown in Fig. 4, the invention may also be employed with crystal transducers. The magnetostrictive transducer 10 shown in Fig. 2 is inductive in nature, and as such is representative of various electrical equivalents which include the electromagnetic and electrodynamic types. The crystal transducer 30 illustrated diagrammatically in Fig. 4 is capacitive in nature, however, and the output circuit is modified somewhat to employ it. The transducer 30 comprises a crystal 31 and a pair of electrodes 32 and 33 on opposite sides thereof. There is a certain small amount of capacitance between the electrodes. The capacitor $C_1$ is chosen to have a capacitance large compared with that between the electrodes, and is connected in series with the transducer 30, the voltage source B, and the charging resistor $R_1$, the circuit again being completed through ground at 12 and 13. An impedance element $Z_{11}$ is connected across the transducer 30. This impedance element may be a resistor or an inductor, depending on the nature of the crystal 31 that is being employed. If the crystal is highly resonant to a particular frequency, that is, if it may be said to have a high Q from a mechanical point of view, shock excitation from the sudden discharge of the storage capacitor $C_1$ is sufficient to produce a large pulse of energy in the water. Then a resistor may be suitably employed as the impedance element. If on the other hand, the crystal that is being employed does not readily oscillate mechanically with large amplitudes when it is shock excited, then the impedance element is preferably an inductor, having an inductance $L_{11}$. The inductance of the inductor $L_{11}$ is sufficiently large with respect to the capacitance of the transducer 30 so that the two together appear inductive to the rest of the circuit, and is particularly chosen so that the electrical resonance of the circuit occurs at the same frequency as the mechanical resonance of the crystal 31. In other respects, the embodiment of Fig. 4 is like that of Figs. 1 or 2 and like parts bear the same reference characters.

Since further modifications and equivalents of the invention will occur to those who are skilled in the art, it is intended that the claims that follow shall not be limited by the particular embodiments of the invention that are shown and described herein, but only by the prior art.

I claim:

1. In an echo ranging system, in combination: an electroacoustic transducer, a storage capacitor, and a source of unidirectional current connected together in a series loop, said loop being electrically resonant substantially to the frequency of mechanical resonance of said transducer; a receiver input circuit having a capacitor and an inductor in series connected across said source with the capacitor end connected to the junction between said source and said storage capacitor, said input circuit being resonant to substantially the same frequency as said loop; and unitary means for providing a substantially zero impedance path across both said source and input circuit simultaneously.

2. In an echo ranging system, in combination: an electroacoustic transducer, a storage capacitor, and a source of unidirectional current connected together in a series loop; a receiver input circuit having a capacitor and an impedance element in series connected across said source with the capacitor end connected to the junction between said source and said storage capacitor; and unitary means for providing a substantially zero impedance path across both said source and input circuit simultaneously.

3. In an echo ranging system, in combination: an electroacoustic transducer, a storage capacitor, and a source of unidirectional current connected together in a series loop, said source being connected at its positive side to said capacitor and at its negative side to said transducer; a receiver input circuit having a capacitor and an impedance element in series connected across said source with the capacitor end connected to the junction between said source and said storage capacitor; and unitary means for providing a substantially zero impedance path across both said source and input circuit simultaneously.

4. In an echo ranging system, in combination: an electroacoustic transducer, a storage capacitor, and a source of unidirectional current connected together in a series loop, said source being connected at its positive side to said capacitor and at its negative side to said transducer; a receiver input circuit having a capacitor and an impedance element in series connected across said source with the capacitor end connected to the junction between said source and said storage capacitor; an electron tube in said receiver, having at least a cathode and a control grid, said cathode and control grid being connected to opposite ends respectively of said impedance element, with said control grid at the capacitor end thereof; and unitary means for providing a substantially zero impedance path across both said source and input circuit simultaneously.

5. In an echo ranging system, in combination: an electroacoustic transducer, a storage capacitor, and a source of unidirectional current connected together in a series loop; a receiver input circuit having a capacitor and an impedance element in series connected across said source with the capacitor end connected to the junction between said source and said storage capacitor; a single switch means connected across both said source and input circuit to provide a substantially zero impedance path across each of said source and said input circuit simultaneously, and means for momentarily operating said switch means.

6. In an echo ranging system, in combination: an electroacoustic transducer, a storage capacitor, a charging resistor, and a unidirectional current source connected together in a series loop, said source and resistor adjoining each other; a receiver input circuit having a capacitor and an impedance element in series connected across said source and resistor in series with one side of said receiver capacitor and one side of said storage capacitor directly connected together; and unitary means for providing a substantially zero impedance path across both said source and resistor and said input circuit simultaneously.

7. In an echo ranging system, in combination: electroacoustic transducer means, first and second capacitors, and an impedance element connected in a series loop, said loop being series resonant to the frequency of oscillation of said transducer means; unidirectional current supply means connected between the junction of said capacitors and the junction of said transducer means and said element; an amplifier tuned to said frequency of oscillation connected at its input across said element, said input including an electron tube with grid and cathode electrodes, of which the cathode is connected to the end of said element nearest said current supply means; and means for providing a substantially zero impedance path between said junctions.

8. In an echo ranging system, in combination: an electroacoustic transducer, a storage capacitor, and first means providing a source of unidirectional current and resistance connected together in a series loop; a receiver input circuit having a capacitor and an impedance element in series connected across said first means with the capacitor end connected to the junction between said first means and said storage capacitor; and second means for providing a path having substantially zero impedance across both said first means and input circuit simultaneously.

9. In an echo ranging system, in combination: an electroacoustic transducer, a storage capacitor, and a source of unidirectional current connected together in a series loop, said source including resistance; a receiver input circuit having a capacitor and an impedance element in series connected across said source with the capacitor end connected to the junction between said source and said storage capacitor; and unitary means for providing a path having substantially zero impedance across both said source and input circuit simultaneously.

10. In an echo ranging system, in combination: an electroacoustic transducer, a storage capacitor, and a source of unidirectional current connected together in a series loop; a receiver input circuit having a capacitor and an impedance element in series connected across said source with the capacitor end connected to the junction between said source and said storage capacitor; control means having normally substantially infinite impedance connected simultaneously across both said source and input circuit; and means substantially instantaneously to lower the impedance of said control means substantially to zero.

11. In an echo ranging system, in combination: an electroacoustic transducer, a storage capacitor, and first means providing a source of unidirectional current and resistance connected together in a series loop; a receiver input circuit having a capacitor and an impedance element in series connected across said first means with the capacitor end connected to the junction between said first means and said storage capacitor; and second means for providing an electrically conductive path across said first means, said path having impedance of a magnitude sufficiently low to permit oscillatory discharge of said storage capacitor through said transducer and said path.

12. In an echo ranging system, in combination: an electroacoustic transducer, a storage capacitor, and a source of unidirectional current connected together in a series loop, said source including resistance; a receiver input circuit having a capacitor and an impedance element in series connected across said source with the capacitor end connected to the junction between said source and said storage capacitor; and unitary means for providing an electrically conductive path across said source, said path having impedance of a magnitude sufficiently low to permit oscillatory discharge of said storage capacitor through said transducer and said path.

13. In an echo ranging system, in combination: an electroacoustic transducer, a storage capacitor, and a source of unidirectional current connected together in a series loop; a receiver input circuit having a capacitor and an impedance element in series connected across said source with the capacitor end connected to the junction between said source and said storage capacitor; control means having normally substantially infinite impedance connected simultaneously across both said source and input circuit; and means substantially instantaneously to lower the impedance of said control means to a value sufficiently low to permit oscillatory discharge of said storage capacitor through said transducer and said control means.

ROBERT A. FRYKLUND.

REFERENCES CITED

The following references are of record in the file of this patent:

UNITED STATES PATENTS

| Number | Name | Date |
|---|---|---|
| 1,948,253 | Blondel | Feb. 20, 1934 |
| 2,032,893 | Settegast et al. | Mar. 3, 1936 |
| 2,446,937 | Lorance | Aug. 10, 1948 |